(12) United States Patent
Kim et al.

(10) Patent No.: US 11,214,638 B2
(45) Date of Patent: Jan. 4, 2022

(54) METHOD FOR PRODUCING HIGHLY REACTIVE POLYBUTENE

(71) Applicant: DL CHEMICAL CO., LTD., Seoul (KR)

(72) Inventors: Myeong Seok Kim, Sejong-si (KR); Min Sup Park, Daejeon (KR); Se Hyun Lee, Daejeon (KR); Jin Wook Lee, Sejong-si (KR); Jae Hoon Lee, Sejong-si (KR)

(73) Assignee: DL CHEMICAL CO., LTD., Seoul (KR)

( * ) Notice: Subject to any disclaimer, the term of this patent is extended or adjusted under 35 U.S.C. 154(b) by 0 days.

(21) Appl. No.: 16/856,868

(22) Filed: Apr. 23, 2020

(65) Prior Publication Data
US 2020/0339714 A1 Oct. 29, 2020

(30) Foreign Application Priority Data
Apr. 24, 2019 (KR) .......................... 10-2019-0047951

(51) Int. Cl.
*C08F 110/10* (2006.01)
(52) U.S. Cl.
CPC .................. *C08F 110/10* (2013.01)
(58) Field of Classification Search
CPC ..................................................... C08F 110/10
USPC ....................................................... 526/212
See application file for complete search history.

(56) References Cited

U.S. PATENT DOCUMENTS

| | | |
|---|---|---|
| 4,605,808 A | 8/1986 | Samson |
| 5,068,490 A | 11/1991 | Eaton |
| 5,191,044 A | 3/1993 | Rath et al. |
| 5,408,018 A | 4/1995 | Rath |
| 5,962,604 A | 10/1999 | Rath |
| 6,300,444 B1 | 10/2001 | Tokumoto et al. |
| 7,037,999 B2 | 5/2006 | Baxter, Jr. et al. |
| 2010/0234542 A1* | 9/2010 | Blackborow ........... C08F 10/10 526/77 |
| 2013/0178679 A1 | 7/2013 | Wettling et al. |

FOREIGN PATENT DOCUMENTS

| | | |
|---|---|---|
| EP | 3029075 A1 | 6/2016 |
| EP | 3421509 A1 | 1/2019 |
| JP | 3795666 B2 | 11/1998 |
| KR | 10-0714152 B1 | 5/2007 |
| WO | 02/38630 A1 | 5/2002 |

OTHER PUBLICATIONS

Search Report dated Sep. 17, 2020 issued in corresponding European Application No. 20169640.

* cited by examiner

*Primary Examiner* — William K Cheung
(74) *Attorney, Agent, or Firm* — Nath, Goldberg & Meyer; Tanya E. Harkins

(57) ABSTRACT

A method for preparing polybutene by polymerization of a raw material of a carbon number 4 (C4) compounds having an isobutene amount of 50 to 75% by weight, is disclosed. The raw material of C4 compounds is selected from the group consisting of (a) C4 compound material obtained by adding high purity isobutene to C4 raffinate-1; (b) C4 compound material obtained by adding high amount isobutene mixture which is generated in an olefin conversion unit (OCU) process to C4 raffinate-1; (c) C4 compound material obtained by adding high purity to butane-butene oil (B-B oil); (d) C4 compound material obtained by adding high amount isobutene mixture which is generated in an olefin conversion unit (OCU) process to butane-butene oil (B-B oil); (e) C4 compound material obtained by adding a dilute solvent to high purity isobutene; (f) C4 compound material obtained by adding a dilute solvent to high amount isobutene mixture which is generated in an olefin conversion unit (OCU) process; (g) C4 compound material obtained by adding high purity isobutene to a mixture generated in dehydrogenation reaction that converts isobutane to isobutene; and (h) C4 compound material obtained by adding high amount isobutene mixture which is generated in an olefin conversion unit (OCU) process to a mixture generated in dehydrogenation reaction that converts isobutane to isobutene.

12 Claims, No Drawings

METHOD FOR PRODUCING HIGHLY REACTIVE POLYBUTENE

CROSS-REFERENCE TO RELATED APPLICATION

This application claims priority to, and the benefit of Korean Patent Application No. 10-2019-0047951 filed on Apr. 24, 2019, the content of which is hereby incorporated by reference in its entirety.

FIELD OF THE INVENTION

The present invention relates to a method for preparing highly reactive polybutene, and more particularly, to a method for preparing highly reactive polybutene in which total amount of alpha (a) vinylidene and beta (13) vinylidene is 92% or more with respect to the amount of total double bond.

BACKGROUND OF THE INVENTION

Polybutene is generally prepared by polymerizing olefin components having a carbon number of 4 (C4) derived during the naphtha degrading process using a Friedel-Craft type catalyst and has a number average molecular weight (Mn) of about 300 to 5,000. Among the C4 raw materials, remainder from which 1,3-butadiene is extracted out is called C4 raffinate-1. C4 raffinate-1 includes paraffin such as isobutane, normal butane and olefin such as 1-butene, 2-butene, and isobutene and so on. Among these, the isobutene amount is about 30 to 50% by weight. The C4 raffinate-1 is mostly used for preparation of polybutene or methyl-t-butyl ether (MTBE) which is an octane number enhancer. Polybutene is mostly composed of isobutene units having the highest reactivity among olefin components of C4 raffinate-1. Further, polybutene can be prepared from high purity isobutene or butane-butene oil (B-B oil), i.e. a C4 mixture derived during the crude oil refining process.

As the molecular weight increases, the viscosity of polybutene increases. Polybutene has a viscosity of about 4 to 40,000 cSt (centi-stocks) at 100° C. Polybutene is pyrolyzed at a temperature of 300° C. or above without residues. Further, polybutene has a branched chain alkyl structure, thereby having good solubility to lubricating oil or fuel. Therefore, the polybutene is added to engine oil and used as an anti-scuff agent or a viscosity index improver or mixed with fuel for an internal combustion engine of automobiles and used as a detergent.

Typically, polybutene is mostly used for a gluing agent, an adhesive, and insulating oil so that products having high reactivity are not preferred. However, recently, a polar group is introduced to polybutene to thereby be used as a fuel detergent or lubricating oil additive, and thus need for polybutene having high reactivity is gradually increased. Therefore, highly reactive polybutene capable of introducing polar groups using reactivity is mainly used for the production of fuel detergent and lubricating oil additives. An example of a product which is obtainable by introducing a polar group is polyisobutenyl succinic anhydride (PIBSA) which is prepared by reacting of a double bond at the terminal of a highly reactive polybutene with maleic anhydride. Most of fuel detergents or lubricating oil additives are prepared by using the PIBSA as an intermediate. When the double bond of polybutene used for PIBSA preparation is located at the terminal of polybutene, PIBSA is obtained at high yield. However, when the double bound is located at the internal of polybutene, and in particular, the number of substituted alkyl group at the double bound is high, PIBSA yield is decreased due to low reactivity caused by steric hindrance.

Producing double bond at the terminal of polybutene and terminating polymerization indicate production of a compound opposite to general chemical reaction theory. The most effective way to prepare highly reactive polybutene, which is difficult to produce, is to use a complex catalyst in which a catalyst and cocatalyst are mixed. Before highly reactive polybutene is used, PIBSA is prepared with normal polybutene, i.e. non-reactive polybutene. One method to increase reactivity of non-reactive polybutene is that polybutene is chlorinated through chlorination reaction using chlorine gas, and then reacted to maleic anhydride to prepare PIBSA so that the final product is achieved. However, this process requires high cost for preventing corrosion of a reactor, and a large amount of basic solution should be used to neutralize unreacted chlorine gas, so that this process is undesirable in economic and environmental aspects. Moreover, when PIBSA having an increased chlorine content is used as a fuel additive, there are problems such as corrosion of internal combustion engine including an engine of automobile and discharge of chlorine through exhaust, so that an improvement is made by preparing a lubricating oil additive and fuel detergent by using highly reactive polybutene.

Highly reactive polybutene is advantageous when the vinylidene amount is high. Highly reactive polybutene is subjected to Ene reaction (or Alder-Ene reaction) with maleic anhydride at about 230° C. to produce PIBSA. PIBSA produced by the reaction is reacted with alkyl amine to produce polyisobutenyl succinic imide (PIBSI). Then, the PIBSI is mixed with a diluent having a high boiling point to prepare a fuel detergent and a lubricating oil additive. The yield of PIBSA depends on the vinylidene amount at terminal of the highly reactive polybutene, and the higher the vinylidene amount at the terminal, the higher the yield and quality of PIBSA. When the yield of PIBSA increases, the yield of PIBSI also increases, so the amount of the active ingredient which acts as a detergent is high. As such, the use of a highly reactive polybutene instead of a non-reactive polybutene in the manufacture of a lubricating oil additive or a fuel detergent can reduce the reaction step and suppress the use of toxic chlorine gas ($Cl_2$ gas). Therefore, to increase reactivity of polybutene per se, a study has been conducted to prepare highly reactive polybutene including 70% or more, and more preferably 85% or more vinylidene without chlorine which causes corrosion of a device.

As a Friedel-Crafts type catalyst for preparing the highly reactive polybutene, boron trifluoride ($BF_3$), which allows highly reactive polybutene having a relatively high vinylidene amount than other Lewis acids, is generally used. U.S. Pat. Nos. 4,605,808, 5,068,490, 5,191,044, 5,408,018, 5,962,604 and 6,300,444 disclose a method for capable of preparing highly reactive polybutene having 70% or more, and preferably 80% or more of vinylidene by using boron trifluoride or a complex compound of boron trifluoride with a cocatalyst of water, ether, and alcohol. U.S. Pat. No. 5,068,490 discloses a method for preparing polybutene having a vinylidene amount of 80% or more by using, as a catalyst, a complex including boron trifluoride and ether having at least one tertiary alkyl group. The method has advantages in that isomerization is low even for long term contact. In the examples, it has been indicated that, when isopropyl t-butylether having both secondary and tertiary alkyl groups is used, the most excellent result is shown, but the isopropyl t-butylether is expensive and is not produced for conventional purpose so that self-preparation is required. U.S. Pat. Nos. 5,408,018 and 5,962,604 disclose a method for preparing polybutene having 80% or more of vinylidene and low degree of molecular weight distribution by using, as a catalyst, a complex of secondary alcohol and boron trifluoride. However, there are many limitations in the operation condition such that contact is maintained for a short period at a temperature equal to or less than −10° C. for operation rate control, and in order to increase the amount of vinylidene, there are disadvantages such as the use of high purity isobutene raw materials. U.S. Pat. No. 6,300,444 discloses a method for preparing polybutene using a catalyst (boron trifluoride) and a cocatalyst (ether, alcohol and/or water) in a certain molar ratio, in which the complex of the catalyst and the cocatalyst is not formed first, and the catalyst, the cocatalyst and the reaction raw materials are put together in a reactor to produce a highly reactive polybutene, and then a vacuum pump is used to lower the fluorine content in the product. U.S. Pat. No. 7,037,999 discloses a polybutene composition wherein the total amount of alpha (terminal) vinylidene and beta vinylidene is at least 90%, in the polybutene composition of the mid-range vinylidene amount in which 20 to 70% of (alpha) vinylidene amount is maintained. As described above, the conventional polybutene production method is various, such as adjusting the vinylidene amount by changing the cocatalyst combination for forming the complex catalyst, increasing the vinylidene amount, narrowing the molecular weight distribution, or reducing the fluorine content.

SUMMARY OF THE INVENTION

Therefore, a purpose of the present invention is to provide a method for preparing highly reactive polybutene in which, with respect to the amount of total double bond, alpha (terminal) vinylidene amount is 80% or more and total amount of alpha vinylidene and beta vinylidene is 92% or more.

Another purpose of the present invention is to provide a method for preparing polybutene with improved reactivity by increasing the amount of alpha vinylidene and beta vinylidene, without lowering the conversion rate where the raw material, isobutene is polymerized into polybutene.

Still other purpose of the present invention is to provide a method for preparing polybutene which, with its high reactivity, facilitates the introduction of a polar group or functional group, and which is capable of obtaining, in high yield, polybutene derivatives such as polyisobutenyl succinic anhydride (PIBSA).

To achieve the purposes, the present invention provides a method for preparing polybutene by polymerizing a raw material of carbon number 4 (C4) compounds having an isobutene amount of 50 to 75% by weight. The raw material of C4 compounds can be any one selected from the group consisting of (a) a C4 compound material in which an isobutene amount is adjusted to 50 to 75% by weight, obtained by adding high purity isobutene having the isobutene amount of 90 to 100% by weight to C4 raffinate-1 which is a remainder after extracting 1,3-butadiene from the carbon number of 4 (C4) compound derived during a naphtha degrading process; (b) a C4 compound material in which an isobutene amount is adjusted to 50 to 75% by weight, obtained by adding high amount isobutene mixture having isobutene amount of 80 to 97% by weight, which is generated in an olefin conversion unit (OCU) process that produces propylene by the metathesis of ethylene and 2-butene, to C4 raffinate-1 which is a remainder after extracting 1,3-butadiene from a carbon number of 4 (C4) derived during a naphtha degrading process; (c) a C4 compound material in which an isobutene amount is adjusted to 50 to 75% by weight, obtained by adding high purity isobutene having the isobutene amount of 90 to 100% by weight to butane-butene oil (B-B oil) derived from crude oil refining process; (d) a C4 compound material in which an isobutene amount is adjusted to 50 to 75% by weight, obtained by adding high amount isobutene mixture having the isobutene amount of 80 to 97% by weight, which is generated in an olefin conversion unit (OCU) process that produces propylene by the metathesis of ethylene and 2-butene, to butane-butene oil (B-B oil) derived from crude oil refining process; (e) a C4 compound material in which an isobutene amount is adjusted to 50 to 75% by weight, obtained by adding a dilute solvent to high purity isobutene having an isobutene amount of 90 to 100% by weight; (f) a C4 compound material in which an isobutene amount is adjusted to 50 to 75% by weight, obtained by adding a dilute solvent to high amount isobutene mixture having the isobutene amount of 80 to 97% by weight, which is generated in an olefin conversion unit (OCU) process that produces propylene by the metathesis of ethylene and 2-butene; (g) a C4 compound material in which an isobutene amount is adjusted to 50 to 75% by weight, obtained by adding high purity isobutene having the isobutene amount of 90 to 100% by weight to a mixture generated in dehydrogenation reaction that converts isobutane to isobutene; and (h) a C4 compound material in which an isobutene amount is adjusted to 50 to 75% by weight, obtained by adding high amount isobutene mixture having the isobutene amount of 80 to 97% by weight, which is generated in an olefin conversion unit (OCU) process that produces propylene by the metathesis of ethylene and 2-butene to a mixture generated in dehydrogenation reaction that converts isobutane to isobutene. The polybutene has alpha (terminal) vinylidene amount of 80% or more and total amount of alpha vinylidene and beta vinylidene of 92% or more, with respect to total double bond.

The method for preparing polybutene according to the present invention increases the amount of alpha vinylidene and beta vinylidene without lowering the conversion rate in which isobutene of a raw material is polymerized into polybutene, etc., so that the polybutene has alpha (terminal) vinylidene amount of 80% or more and total amount of alpha vinylidene and beta vinylidene of 92% or more, with respect to total double bond, thereby improving the reactivity of the polybutene. The polybutene prepared according to the present invention has high reactivity, so it is easy to introduce a polar group or a functional group, and polybutene derivatives such as polyisobutenyl succinic anhydride (PIBSA) can be produced in high yield.

DETAILED DESCRIPTION OF THE INVENTION

The present invention is explained in detail below.

In a process for preparing polybutene with polymerization of isobutene of a raw material, it was found that, not only the alpha (α) vinylidene (terminal vinylidene) but also beta (β) vinylidene contained in the produced polybutene plays an important role in improving the reactivity of polybutene. In accordance with the present invention based on this, the carbon number 4 compound raw material (C4 raw materials) easily obtained in the petroleum refining process is mixed properly to adjust the isobutene amount in the raw material, thereby increasing the amount of alpha vinylidene and beta vinylidene of polybutene and improving the reactivity, without lowering a conversion rate where isobutene is polymerized into polybutene and so on.

In the method for preparing according to the present invention, the carbon 4 compounds having an isobutene amount of 50 to 75% by weight, preferably 50 to 70% by weight, for example 55 to 60% by weight, is used as a raw material for polybutene polymerization, which is made by mixing the carbon number 4 compounds of raw material (C4 raw materials) usually obtained in the petroleum refining process in an appropriate ratio. In the raw material of the carbon number 4 compounds, as the remaining components other than isobutene, 25 to 50% by weight, preferably 30 to 50% by weight of hydrocarbon compounds having 4 carbon atoms such as isobutane, n-butane, 1-butene, 2-butene, and so on may be included. Here, when the isobutene amount of the C4 raw materials is less than 50% by weight, the amount of alpha vinylidene and beta vinylidene may decrease or the conversion rate of isobutene may decrease, while when it exceeds 75% by weight, there is a problem in that the viscosity of the reaction product is too high to control temperature and control the reaction product. In the raw material used for the reaction of the present invention, though the isobutene amount is less than 50% by weight, if the isobutene amount remaining in the reaction raw material after the reaction is high, that is, if the conversion rate of isobutene polymerization into polybutene, etc. is lowered, amount of the alpha vinylidene and the amount of beta vinylidene in the polybutene can be increased simultaneously. However, when the conversion rate of isobutene is low, the production efficiency of polybutene decreases and the production cost increases. Meanwhile, the reaction raw material used in the present invention maintains, while simultaneously increasing the amount of alpha vinylidene and beta vinylidene of the polybutene to be produced, the conversion rate of isobutene which is contained in the reaction raw material, that is, the polymerization reaction participation rate, to be 80% or more, preferably 85% or more, more preferably 90% or more, for example 85 to 95%, thereby improving polymerization efficiency.

Examples of the raw material of C4 compound include (a) a C4 compound material in which an isobutene amount is adjusted to 50 to 75% by weight, obtained by adding high purity isobutene having the isobutene amount of 90 to 100% by weight (Pure IB, the remaining 0 to 10% by weight includes, for example, isobutane, normal butane, 1-butene and/or 2-butene) to C4 raffinate-1 which is a remainder after extracting 1,3-butadiene from the carbon number of 4 (C4) compounds derived during a naphtha degrading process; (b) a C4 compound material in which an isobutene amount is adjusted to 50 to 75% by weight, obtained by adding high amount isobutene mixture having isobutene amount of 80 to 97% by weight (OCU IB, the remaining 3 to 20% by weight includes, for example, isobutane, normal butane, 1-butene and/or 2-butene), which is generated in an olefin conversion unit (OCU) process that produces propylene by the metathesis of ethylene and 2-butene, to C4 raffinate-1 which is a remainder after extracting 1,3-butadiene from a carbon number of 4 (C4) compounds derived during a naphtha degrading process; (c) a C4 compound material in which an isobutene amount is adjusted to 50 to 75% by weight, obtained by adding high purity isobutene having the isobutene amount of 90 to 100% by weight (pure IB), to butane-butene oil (B-B oil) which is a C4 mixture derived from crude oil refining process; (d) a C4 compound material in which an isobutene amount is adjusted to 50 to 75% by weight, obtained by adding high amount isobutene mixture having the isobutene amount of 80 to 97% by weight (OCU IB), which is generated in an olefin conversion unit (OCU) process that produces propylene by the metathesis of ethylene and 2-butene, to butane-butene oil (B-B oil) which is a C4 mixture derived from crude oil refining process; (e) a C4 compound material in which an isobutene amount is adjusted to 50 to 75% by weight, obtained by adding a dilute solvent to high purity isobutene having an isobutene amount of 90 to 100% by weight; (f) a C4 compound material in which an isobutene amount is adjusted to 50 to 75% by weight, obtained by adding a dilute solvent to high amount isobutene mixture having the isobutene amount of 80 to 97% by weight (OCU IB), which is generated in an olefin conversion unit (OCU) process that produces propylene by the metathesis of ethylene and 2-butene; (g) a C4 compound material in which an isobutene amount is adjusted to 50 to 75% by weight, obtained by adding high purity isobutene having the isobutene amount of 90 to 100% by weight (pure IB) to a mixture generated in dehydrogenation reaction that converts isobutane to isobutene (Oleflex process); or (h) a C4 compound material in which an isobutene amount is adjusted to 50 to 75% by weight, obtained by adding high amount isobutene mixture having the isobutene amount of 80 to 97% by weight (OCU IB), which is generated in an olefin conversion unit (OCU) process that produces propylene by the metathesis of ethylene and 2-butene to a mixture generated in dehydrogenation reaction that converts isobutane to isobutene (Oleflex process).

As the dilute solvent for production of the raw material of the carbon number 4 compounds used in the present invention, an alkane compound having 3 to 8 carbon atoms, preferably 4 to 6 carbon atoms can be used. Examples of the dilute solvent include n-butane, iso-butane, butane mixture, butane-butene mixture (unreacted C4 mixture), n-pentane, pentane mixture, n-hexane, hexane mixture, and the like. Considering the recycling process of unreacted isobutene, etc., it is preferable to use butanes or butane mixtures.

As a polymerization catalyst (main catalyst) of a raw material of carbon number 4 compound (C4 raw materials) used in the method of preparing polybutene according to the present invention, common Friedel Craft type catalysts such as boron trichloride, aluminum trichloride, zinc chloride, etc. i.e., a Lewis acid catalysts can be used. However, it is preferable to use boron trifluoride ($BF_3$), which effectively produces terminal vinylidene and is commercially available. The amount of boron trifluoride used is 0.02 to 1 part by weight with respect to 100 parts by weight of the raw materials of the carbon 4 compound such as isobutene.

When the boron trifluoride ($BF_3$) or the like is used as the main catalyst, it is essential to use an alcoholic catalyst (cocatalyst) to form a complex with the main catalyst, and an auxiliary cocatalyst of ethers may be additionally used. The cocatalyst essential for reactions serves as a proton (H+) donor for reaction initiation, and an alcohol compound having 1 to 4 carbon atoms may be used. Examples of the alcohol compound may include methanol, ethanol, propanol, isopropyl alcohol (isopropanol), butanol, isobutanol, etc. In addition, the auxiliary cocatalyst serves to stabilize protons produced by the cocatalyst, to adjust reactivity of the complex catalyst, and to provides steric hindrance to assist vinylidene formation. An ether compound having 2 to 10 carbon atoms may be used as the auxiliary cocatalyst. Examples of the ether compound may include dimethyl ether, methyl ethyl ether, diethyl ether, ethyl propyl ether, dipropyl ether, diisopropyl ether, methyl butyl ether, methyl propyl ether, methyl isopropyl ether, methyl isobutyl ether, methyl butyl ether, isopropyl sec-butyl ether, sec-butyl ether, isoamyl ether, isopropyl isoamyl ether or sec-butyl isoamyl ether and the like, and diisopropyl ether can be preferably used.

The molar ratio of the cocatalyst/main catalyst constituting the complex catalyst is 1 to 2, preferably 1 to 1.7, and more preferably 1 to 1.4. When the molar ratio of the cocatalyst/main catalyst is less than 1, the catalytic activity is too high, and thus the generated complex catalyst may be deteriorated. If it exceeds 2, the catalytic activity is too low, and thus the production efficiency is likely to decrease. The auxiliary cocatalyst adjusts the catalytic intensity so that the cationic polymerization reaction mainly occurs in isobutene and increases the vinylidene content by imparting steric hindrance to the catalyst. The auxiliary cocatalyst is optional and may be used depending on the situation, may be incorporated in the complex catalyst of the cocatalyst/main catalyst, or may be directly injected into the reaction raw materials. The amount of the auxiliary cocatalyst is preferably 0 to 1 molar ratio with respect to the main catalyst, being low molar ratio. For example, the molar ratio of (cocatalyst and auxiliary cocatalyst)/main catalyst is 1.1 to 3, preferably 1.1 to 2.5, more preferably 1.2 to 2. If the molar ratio of the (cocatalyst and auxiliary cocatalyst)/main catalyst is less than 1.1, the catalytic activity is too high, and the quality of the produced polybutene may be reduced (the vinylidene content is low). On the other hand, if it exceeds 3, the catalytic activity is too low and the production efficiency may decrease. The amount of the auxiliary co-catalyst can be varied depending on the viscosity and molecular weight of the polybutene to be prepared. When preparing polybutene of high viscosity and high molecular weight, a relatively small amount of auxiliary cocatalyst should be used, and when preparing low viscosity and low molecular weight polybutene, a relatively large amount of auxiliary cocatalyst should be used. In the preparation of the complex catalyst, the temperature at which the cocatalyst and the main catalyst are mixed is, for example, −20 to −5° C., preferably −15 to −7° C., more preferably −12 to −9° C. The mixing of main catalyst and the cocatalyst may be performed for example, for 2 to 6 hours, preferably for 3 to 5 hours, and more preferably for 3.5 to 4.5 hours.

A cascade occurs when polymerization is initiated, and polybutene is prepared when a termination reaction is completed. Here, the polymerization initiation is carried out when protons (H+) in the cocatalyst/main catalyst complex catalyst bind to monomers of the reaction raw materials, as shown in following Scheme 1.

[Scheme 1]

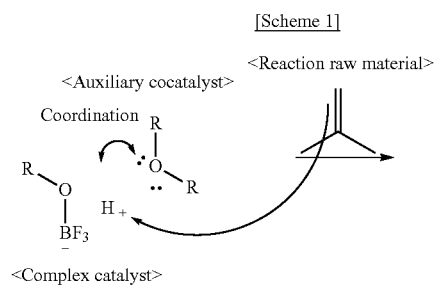

As shown in Scheme 1 above, the auxiliary cocatalyst is coordinated with protons in the complex catalyst to control catalytic strength of the complex catalyst. In addition, such a reaction is initiated when the monomers in the reaction raw materials are protonated with the protons. That is, the process of reacting the complex catalyst of the cocatalyst/main catalyst with the mixture of the auxiliary cocatalyst and the reaction raw materials proceeds are as shown in Scheme 2 below.

[Scheme 2]

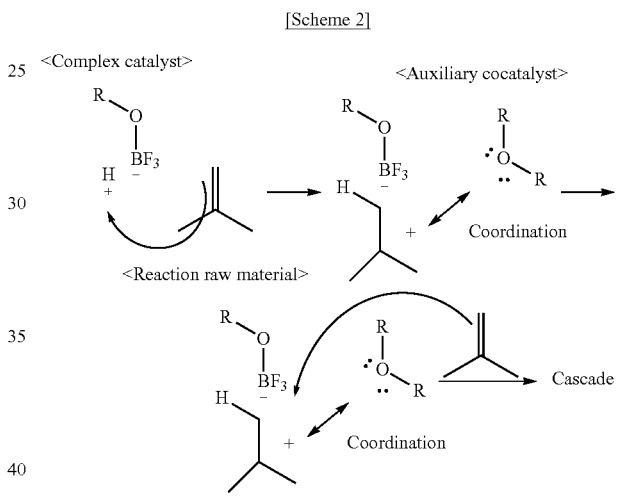

As shown in Scheme 2 above, such a reaction is initiated when the monomers in the reaction raw materials are protonated with the protons, and the auxiliary cocatalyst is then coordinated with cations (cations observed when the protons bind to the reaction raw materials) with which polymerization is initiated so as to control catalytic strength and impart steric hindrance. That is, the auxiliary cocatalyst may control reactivity of the complex catalyst to adjust molecular weights of products, and also continuously impart steric hindrance to induce polymerization so that the reaction raw materials are mainly used. As a result, the products may include a large amount of vinylidene when the reaction is terminated.

The polymerization of the polybutene may be performed under typical reaction conditions, for example, generally performed at a temperature of −40 to 20° C., preferably −35 to 10° C., and more preferably −30 to 5° C. and a pressure of 2.5 kg/cm² or more, preferably 3.0 to 10 kg/cm² for 5 to 120 minutes, preferably 10 to 90 minutes to maintain the reaction raw materials in a liquid state.

In the present invention, the isobutene content in the reaction raw materials is adjusted to 50 to 75% by weight. The present invention uses a complex catalyst composed of the cocatalyst/main catalyst to obtain the highly reactive polybutene in the form of a liquid polymer. The highly reactive polybutene has an alpha vinylidene content of 80% or more, preferably 85% or more and also the total vinylidene content, that is, the sum of the alpha vinylidene content and the beta vinylidene amount of 92% or more, preferably 93% or more, with respect to the entire double bond. The highly reactive polybutene generally has a number average molecular weight (Mn) of 300 to 5,000. The polybutene prepared according to the invention has one double bond per molecule. When the double bond is located at the end of the polybutene, it is referred to as polybutene having alpha vinylidene (also referred to herein simply as 'alpha vinylidene') and when the double bond is located on the second position from the end of the polybutene, it is referred to as polybutene having beta vinylidene (herein, it is also simply referred to as 'beta vinylidene'). Therefore, in the present specification, an alpha vinylidene amount of 80% or more means that the amount of polybutene having alpha vinylidene among all polybutene is 80% (unit: number or mole) or more. Further, in the present invention, when the double bond is located at the third and farther position from the end of the polybutene, it is referred to as polybutene having an internal double bond. The amount of polybutene having such internal double bonds is 5 to 8%, preferably 3 to 7%.

In the polybutene prepared according to the present invention, the relationship between the alpha vinylidene amount, the beta vinylidene amount, and the total vinylidene amount, which is the sum thereof, and the reactivity of the polybutene can be confirmed through a reaction for preparing polyisobutenyl succinic anhydride (PIBSA) by reacting polybutene with maleic anhydride (MA). The research by the present inventors reveals that the yield of PIBSA depends on the molecular weight of the polybutene used, the amount of maleic anhydride used, the reaction temperature, etc. When the number average molecular weight of the polybutene used is 1000, the reaction temperature of polybutene and maleic anhydride is 230° C., and the amount of maleic anhydride used is 1.1 equivalents or 1.3 equivalents, respectively, it can be calculated by Equation 1 or 2 below. Equation 1 below shows that 1.1 equivalents of MA are used, and Equation 2 below shows that 1.3 equivalents of MA are used.

PIBSA yield (%)=alpha vinylidene amount (%)*0.85+beta vinylidene amount (%)*0.5    [Equation 1]

PIBSA yield (%)=alpha vinylidene amount (%)*0.9+beta vinylidene amount (%)*0.6    [Equation 2]

As shown in Equations 1 and 2, PIBSA yield increases rapidly as the amount of alpha vinylidene increases, and since beta vinylidene is also reactive, increasing the total vinylidene amount, which is the sum of alpha vinylidene and beta vinylidene, is advantageous for increasing the PIBSA yield. Therefore, it is possible to increase the PIBSA yield by maximizing the alpha vinylidene amount and making the total vinylidene amount be 92% or more in polybutene. As described above, when PIBSA is prepared by reacting the highly reactive polybutene of the present invention with maleic anhydride and a lubricating oil additive is prepared using the PIBSA, the amount of active ingredient can be increased. As such, there has been no prior art that mentions the importance of beta vinylidene and thus total vinylidene amount for the introduction of polar or functional groups into polybutene.

The reaction product polymerized in cascade can be treated as follows. First, the reaction product is discharged from a reactor to be transferred to a neutralization/washing tank. At the neutralization/washing tank, polymerization process water including water and a neutralizing agent (for example, sodium hydroxide), is added to the reaction product to remove catalyst components from the reaction product and neutralize the reaction product. At the separation, the reaction product is separated into organic compounds and a water layer using the principle of phase separation into water and oil. The organic compounds is supplied to the C4 distillation column, and a water layer (or waste water) including catalyst components is discharged through a separate line. At the C4 distillation column, unreacted C4 among the organic compounds fed from the separation tank is distilled and collected and reused as needed. The residual organic compounds are supplied to the LP distillation column. At the LP distillation column, the LP having a molecular weight less than that of the desired polybutene, among the residual organic compounds flowing out of the C4 distillation column is distilled and collected, and the highly reactive polybutene from which LP is removed is stored in the product storage tank.

MODE FOR INVENTION

Hereinafter, examples of the present invention are provided for better understanding of the present invention. The following examples are exemplary, and the present invention is not limited by the examples.

Examples 1 to 6, Comparatives Examples 1 to 7

Preparation of Polybutene Having Number Average Molecular Weight of 1000

Polymerization was performed by to a reactor (IPE: Diisopropyl ether). introducing raw materials of carbon number 4 compounds which was prepared by alone or combination of the compounds or compositions (a) to (g) shown in Table 1 below (% by weight), and complex catalyst (1) or (2) shown in Table 2 below. For comparison, the number average molecular weight of the produced polybutene was set to approximately 1000. So as to maintain the raw material in a liquid state, the reaction temperature was maintained at −23 to −15° C., the reaction pressure was maintained at 3 kg/cm² or higher, and the average residence time was 45 minutes, and catalysts of 0.1 to 0.5 parts by weight based on 100 parts by weight of isobutene was injected. After 180 minutes, a reaction product was discharged from the reactor. At the neutralization/washing tank, a 5% by weight caustic soda solution was added to the reaction product to remove the catalyst. Subsequently, the reaction products were transferred to a separation tank to discharge and remove wastewater including catalyst, and the remaining (organic layer) was introduced into a C4 distillation column. At the C4 distillation column, the organic material layer was heated to 100° C. for the C-4 component to be discharged and collected, and the remaining was transferred to an LP distillation column. The reaction products transferred to the LP distillation column are heated at a temperature of 230° C., and 25 torr for a residence time of 30 minutes and among the reaction products, LP (light polymer) is discharged and collected and the residue, a highly reactive polybutene, was transferred and stored in a product storage tank. The molecular weight of the prepared highly reactive polybutene was measured by GPC (Gel permeation chromatography), and vinylidene in polybutene was analyzed using C13-NMR. The conversion rate of isobutene into polybutene, amount of alpha vinylidene and amount of beta vinylidene, etc. were summarized, which was shown in Table 3. The obtained highly reactive polybutene and maleic anhydride (used amount: 1.1 equivalents to polybutene) were reacted at 230° C. for 4 hours to obtain PIBSA. The yield of PIBSA was measured by column chromatography, and the results are shown in Table 3.

TABLE 1

|  | iso-butane % | n-butane % | 1-butene % | C-2-butene % | T-2-butene % | Iso-butene % |
|---|---|---|---|---|---|---|
| (a) Pure IB | 0.4 | — | — | — | — | 99.6 |
| (b) OCU IB | 6.2 | 2.0 | 1.3 | 0.2 | 1.3 | 89.0 |
| (c) Oleflex IB | 54.4 | 1.7 | 0.5 | 0.5 | 0.6 | 42.3 |
| (d) C4 raffinate-1 | 4.1 | 10.2 | 32.2 | 5.8 | 8.4 | 39.3 |
| (e) B-B oil | 3.7 | 16.1 | 35.0 | 2.3 | 7.5 | 35.4 |
| (f) butane-butene mixture | 78.7 | 5.9 | 7.1 | 1.1 | 1.2 | 6.0 |
| (g) isobutane | 97.4 | 2.4 | — | — | — | 0.2 |

TABLE 2

| | Complex catalyst(auxiliary cocatalyst/ cocatalyst/main catalyst, mole ratio) | Mole ratio |
|---|---|---|
| (1) | Isopropanol (1.5)/Boron trifluoride | 1.50 |
| (2) | IPE(0.5)/Isopropanol (1.0)/Boron trifluoride | 1.50 |

TABLE 3

| | Complex catalyst | Raw materials composition | IB amount (weight %) | Reaction temperature (° C.) | Isobutene conversion rate(%) | Number average molecular weight | Vinylidene (alpha/beta/ total), % | PIBSA yield (Calculation/ experimental results) |
|---|---|---|---|---|---|---|---|---|
| Example 1 | 1 | a + g | 65 | −17 | 91 | 980 | 90/5/95 | 79.0/78.9 |
| Example 2 | 1 | b + g | 62 | −19 | 90 | 960 | 89/4/93 | 77.7/77.4 |
| Example 3 | 1 | a + c | 56 | −18 | 90 | 990 | 89/5/94 | 78.2/78.2 |
| Example 4 | 2 | a + d | 56 | −21 | 87 | 1020 | 86/7/93 | 76.6/76.5 |
| Example 5 | 2 | a + e | 57 | −23 | 87 | 960 | 85/7/92 | 75.8/76.0 |
| Example 6 | 2 | b + f + g | 60 | −18 | 89 | 990 | 89/5/94 | 78.2/78.1 |
| Comparative Example 1 | 1 | c | 42 | −25 | 90 | 960 | 84/7/91 | 74.9/74.7 |
| Comparative Example 2 | 2 | d | 39 | −24 | 75 | 1000 | 83/7/90 | 74.1/74.0 |
| Comparative Example 3 | 2 | e | 35 | −25 | 68 | 950 | 79/8/87 | 71.2/71.5 |
| Comparative Example 4 | 1 | a + f + g | 42 | −24 | 90 | 970 | 85/4/89 | 74.3/74.3 |
| Comparative Example 5 | 1 | b + f | 42 | −25 | 90 | 990 | 85/5/90 | 74.8/74.5 |
| Comparative Example 6 | 2 | d + b | 46 | −23 | 89 | 970 | 84/6/90 | 74.4/74.4 |
| Comparative Example 7 | 2 | e + b | 42 | −24 | 89 | 980 | 83/6/89 | 73.6/73.5 | reacted under the same condition as in the Examples to obtain PIBSA, whose yield is 71.2 to 74.7%. Looking at the PIBSA yield of the Examples and Comparative examples, a gap occurs up to 7.7%. That is, it can be seen that when the isobutene amount in the reaction raw material is controlled to be lower than 50% by weight as in the Comparative example, the total vinylidene amount of the produced polybutene is lowered, and the yield of PIBSA is lowered in the reaction with maleic anhydride.

The low PIBSA yield means that the yield of active ingredients in the polyisobutenylsuccinic imide (PIBSI) which is used as a lubricating oil additive (dispersant) or as a detergent (Detergent) for a fuel detergent is low, wherein PIBSI is produced by the reaction of amine, with PIBSA which is obtained by the reaction of polybutene with maleic anhydride. Therefore, the highly reactive polybutene according to the present invention increases the yield of PIBSA, lowers the production cost of polybutene and improves the working efficiency. This means that when polybutene is obtained at the same cost, the product value of the present highly reactive polybutene is excellent. The above Examples and Comparative examples were carried out for polybutene products having a number average molecular weight of 1000, but the same tendency can be obtained for grades of polybutene products having a number average molecular weight of 750, 1300 or 2300.

As described above, according to the present invention, the isobutene amount in the reaction raw material is adjusted As shown in Table 3, in Examples 1 to 6, the amount of isobutene contained in the reaction raw material was adjusted to 50 to 75% by weight, so that a highly reactive polybutene having a total amount of alpha and beta vinylidene of 92% or more was obtained. The obtained highly reactive polybutene was reacted with maleic anhydride to produce PIBSA in a yield of 76.0 to 78.9%. On the other hand, in Comparative Examples 1 to 7, the amount of isobutene in the reaction raw materials was less than 50% by weight, and the total amount of alpha and beta vinylidene in the obtained polybutene was less than 92%. The polybutenes from the Comparative examples and maleic anhydride were to 50 to 75% by weight, so that the total vinylidene amount, which is the sum of the alpha vinylidene amount and beta vinylidene amount, is 92% or more to prepare highly reactive polybutene. PIBSA can be obtained with high yield by reacting the highly reactive polybutene thus prepared with maleic anhydride. In addition, according to the present invention, the conversion of isobutene is as high as 85% or more, so that polymerization efficiency is high and manufacturing cost can be reduced, in the production of highly reactive polybutene. Therefore, according to the present invention, high-quality, highly reactive polybutene can be produced with high productivity.

The invention claimed is:

1. A method for preparing polybutene, comprising the steps of:
obtaining a raw material of carbon number 4 (C4) compounds having an isobutene amount of 50 to 75% by weight,
wherein the raw material of C4 compounds is first prepared by a method selected from the group consisting of (a) preparing a C4 compound material in which an isobutene amount is adjusted to 50 to 75% by weight, by adding high amount isobutene mixture having isobutene amount of 80 to 97% by weight, which is generated in an olefin conversion unit (OCU) process that produces propylene by the metathesis of ethylene and 2-butene, to C4 raffinate-1 which is a remainder after extracting 1,3-butadiene from a C4 compound derived during a naphtha degrading process; (b) preparing a C4 compound material in which an isobutene amount is adjusted to 50 to 75% by weight, by adding high amount isobutene mixture having the isobutene amount of 80 to 97% by weight, which is generated in an olefin conversion unit (OCU) process that produces propylene by the metathesis of ethylene and 2-butene, to butane-butene oil (B-B oil) derived from crude oil refining process; (c) preparing a C4 compound material in which an isobutene amount is adjusted to 50 to 75% by weight, by adding a dilute solvent to high amount isobutene mixture having the isobutene amount of 80 to 97% by weight, which is generated in an olefin conversion unit (OCU) process that produces propylene by the metathesis of ethylene and 2-butene; and (d) preparing a C4 compound material in which an isobutene amount is adjusted to 50 to 75% by weight, by adding high amount isobutene mixture having the isobutene amount of 80 to 97% by weight, which is generated in an olefin conversion unit (OCU) process that produces propylene by the metathesis of ethylene and 2-butene to a mixture generated in dehydrogenation reaction that converts isobutane to isobutene, and
polymerizing the raw material of carbon number 4 (C4) compounds,
wherein the polybutene has alpha vinylidene amount of 80% or more and total amount of alpha vinylidene and beta vinylidene of 92% or more, with respect to amount of total double bond.

2. The method as claimed in claim 1, wherein raw C4 compound material is obtained by adding a dilute solvent to high amount isobutene mixture having the isobutene amount of 80 to 97% by weight, generated in an olefin conversion unit (OCU) process that produces propylene by the metathesis of ethylene and 2-butene, and wherein the dilute solvent is selected from the group consisting of n-butane, iso-butane, butane mixture, butane-butene mixture, n-pentane, pentane mixture, n-hexane and hexane mixture.

3. The method as claimed in claim 1, wherein the polymerization is carried out in the presence of a complex catalyst formed of a main catalyst and a cocatalyst, the main catalyst being selected from the group consisting of boron trichloride, aluminum trichloride, zinc chloride, and boron trifluoride and the cocatalyst being alcohols, and a molar ratio of the cocatalyst/main catalyst constituting the complex catalyst is 1 to 2.

4. The method as claimed in claim 3, wherein the main catalyst is boron trifluoride, and the amount of boron trifluoride used is 0.02 to 1 part by weight based on 100 parts by weight of the raw material of the C4 compound.

5. The method as claimed in claim 3, wherein the cocatalyst is selected from the group consisting of methanol, ethanol, propanol, isopropyl alcohol, butanol and isobutanol.

6. The method as claimed in claim 3, wherein the polymerization is carried out in the presence of an auxiliary cocatalyst, the auxiliary cocatalyst being selected from the group consisting of dimethyl ether, methyl ethyl ether, diethyl ether, ethyl propyl ether, dipropyl ether, diisopropyl ether, methyl butyl ether, methyl propyl ether, methyl isopropyl ether, methyl isobutyl ether, methyl butyl ether, isopropyl sec-butyl ether, sec-butyl ether, isoamyl ether, isopropyl isoamyl ether and sec-butyl isoamyl ether.

7. The method as claimed in claim 1, wherein the polymerization is carried out at a temperature of −40 to 20° C., a pressure condition of 3 kg/cm$^2$ or more, for 5 to 120 minutes.

8. The method as claimed in claim 1, wherein the raw material for the carbon number 4 compound includes 50 to 75% by weight of isobutene and 25 to 50% by weight of hydrocarbon compounds having 4 carbon atoms other than isobutene.

9. The method as claimed in claim 1, wherein the isobutene amount in the raw material of the carbon number 4 is 50 to 70% by weight.

10. The method as claimed in claim 1, wherein a conversion rate of isobutene in the raw material of the C4 compound to polybutene is 80% or more.

11. The method as claimed in claim 1, wherein in the polybutene, the alpha vinylidene amount is 85% or more, and the total vinylidene amount, being the sum of the alpha vinylidene amount and the beta vinylidene amount, is 93% or more, with respect to the amount of total double bond.

12. The method as claimed in claim 1, wherein in the polybutene an amount of an internal double bond, excluding the alpha vinylidene and the beta vinylidene is 3 to 8% with respect to the amount of total double bond.

* * * * *

UNITED STATES PATENT AND TRADEMARK OFFICE
CERTIFICATE OF CORRECTION

PATENT NO. : 11,214,638 B2
APPLICATION NO. : 16/856868
DATED : January 11, 2022
INVENTOR(S) : Myeong Seok Kim et al.

It is certified that error appears in the above-identified patent and that said Letters Patent is hereby corrected as shown below:

In the Claims

Claim 7, Column 14, Line 29, please delete the phrase "polymerization is carried out" and replace with "polymerization step is carried out".

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*